(12) United States Patent
Belelie et al.

(10) Patent No.: US 7,691,920 B2
(45) Date of Patent: *Apr. 6, 2010

(54) INK JET OF FUNCTIONALIZED WAXES

(75) Inventors: Jennifer L. Belelie, Oakville (CA);
Peter G. Odell, Mississauga (CA);
Eniko Toma, Mississauga (CA); Paul F. Smith, Oakville (CA); Rina Carlini, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 1478 days.

This patent is subject to a terminal disclaimer.

(21) Appl. No.: 11/034,714

(22) Filed: Jan. 14, 2005

(65) Prior Publication Data

US 2006/0158491 A1    Jul. 20, 2006

(51) Int. Cl.
| | |
|---|---|
| *A61L 24/00* | (2006.01) |
| *B01F 3/04* | (2006.01) |
| *B05D 1/32* | (2006.01) |
| *B41J 2/01* | (2006.01) |
| *B41J 2/16* | (2006.01) |
| *B41J 2/17* | (2006.01) |
| *B41J 29/38* | (2006.01) |
| *C07D 209/48* | (2006.01) |
| *C07D 303/40* | (2006.01) |
| *G01D 11/00* | (2006.01) |
| *C08F 2/00* | (2006.01) |
| *C08F 2/46* | (2006.01) |
| *C08F 14/06* | (2006.01) |
| *C08F 20/22* | (2006.01) |
| *C08G 59/14* | (2006.01) |
| *C08G 65/18* | (2006.01) |
| *C08J 3/28* | (2006.01) |
| *C09D 5/00* | (2006.01) |
| *C09D 11/00* | (2006.01) |

(52) U.S. Cl. .................... 523/160; 347/1; 347/6; 347/95; 347/96; 347/100; 522/100; 522/168; 522/170; 522/173; 522/176; 522/181; 522/182; 522/183; 522/184; 522/186; 427/466; 523/161

(58) Field of Classification Search .............. 523/160, 523/161; 522/100, 168, 170, 173, 176, 181, 522/182, 183, 184, 186, 187; 347/1, 6, 95, 347/96, 99, 100; 427/466
See application file for complete search history.

(56) References Cited

U.S. PATENT DOCUMENTS

| | | | |
|---|---|---|---|
| 6,536,889 B1 | 3/2003 | Biegelsen et al. | |
| 6,547,380 B2 | 4/2003 | Smith et al. | |
| 6,561,640 B1 | 5/2003 | Young | |
| 7,293,868 B2 * | 11/2007 | Odell et al. | 347/100 |
| 2003/0202079 A1 * | 10/2003 | Hirai | 347/99 |
| 2007/0142492 A1 * | 6/2007 | Odell et al. | 522/74 |
| 2008/0000384 A1 * | 1/2008 | Belelie et al. | 106/31.13 |

FOREIGN PATENT DOCUMENTS

WO    WO 03/089486 A1 * 10/2003

* cited by examiner

*Primary Examiner*—Patrick D Niland
(74) *Attorney, Agent, or Firm*—Oliff & Berridge, PLC

(57) ABSTRACT

An ink jet ink includes an ink vehicle, wherein the ink vehicle includes at least one wax monomer functionalized to include in the chain at least one reactive group curable upon exposure to radiation. The reactive group is preferably curable via cationic or free radical polymerization. In a preferred embodiment, the ink vehicle includes a wax monomer having a structure:

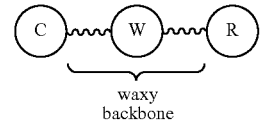

wherein C represents a cationically curable group and R represents a radically curable group. The inks may be used to form an image by jetting the ink onto a transfuse member surface, increasing the viscosity of the ink upon the transfuse member surface, subsequently transferring the ink from the transfuse member surface to an image receiving substrate, and exposing the ink to radiation following the transfer to the image receiving substrate to effect reaction of the at least one reactive group.

14 Claims, No Drawings

INK JET OF FUNCTIONALIZED WAXES

BACKGROUND

Described herein are ink jet inks that are comprised of wax backbones containing at least one functionalized group, and methods of forming an image with such inks.

The volume of digital color printing is expected to experience significant growth in the coming years. The color images provided by ink jet printing inks are overwhelmingly preferred in panel studies over other digital imaging systems. There is also a strong case to be made that the total cost of ownership of an ink jet printer will ultimately be cheaper than similar volume electrophotography units.

Ink jetting devices are known in the art, and thus extensive description of such devices is not required herein. As described in U.S. Pat. No. 6,547,380, incorporated herein by reference, ink jet printing systems are generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field that adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium. There are three types of drop-on-demand ink jet systems. One type of drop-on-demand system is a piezoelectric device that has as its major components an ink filled channel or passageway having a nozzle on one end and a piezoelectric transducer near the other end to produce pressure pulses. Another type of drop-on-demand system is known as acoustic ink printing. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. Still another type of drop-on-demand system is known as thermal ink jet, or bubble jet, and produces high velocity droplets. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink vehicle (usually water) in the immediate vicinity to vaporize almost instantaneously and create a bubble. The ink at the orifice is forced out as a propelled droplet as the bubble expands.

In a typical design of a piezoelectric ink jet device, the image is applied by jetting appropriately colored inks during four to six rotations (incremental movements) of a substrate (e.g., an intermediate transfer member surface) with respect to the ink jetting head, i.e., there is a small translation of the printhead with respect to the substrate in between each rotation. This approach simplifies the printhead design, and the small movements ensure good droplet registration.

In certain ink jet devices, including piezoelectric devices, it is desirable to employ transfuse, i.e., a transfer and fusing step, in forming the image. Transfuse plays an important role in piezoelectric ink jet printers by enabling a high quality image to be built up on a rapidly rotating transfer member. This approach simplifies the printhead design, while the small movements of the head ensures good droplet registration. Transfuse typically involves jetting the ink from the ink jet head onto an intermediate member such as a belt or drum, i.e., a transfuse member. This allows the image to be rapidly built onto the transfuse member and then subsequently transferred and fused to an image receiving substrate.

Hot melt inks typically used with ink jet printers of the aforementioned type utilize a wax based ink vehicle, e.g., a crystalline wax. Such solid ink jet inks provide vivid color images. These crystalline wax inks are jetted at temperatures at which they are liquids, and then are cooled to solidify on the intermediate transfuse member before being transferred to an image receiving substrate such as paper. Transfuse spreads the image droplet, providing a richer color and lower pile height. The low flow of the solid ink also prevents show through on the paper.

In particular, the crystalline wax inks are jetted onto a transfuse member, for example, an aluminum drum, at temperatures of approximately 130-140° C. The wax based inks are heated to such high temperatures to decrease their viscosity (i.e., to change the inks from a solid state at room temperature to liquid at jetting temperature) for efficient and proper jetting onto the transfuse member. The transfuse member is heated to approximately 60° C., so that the wax will cool sufficiently to solidify or crystallize. As the transfuse member rolls over the recording medium, e.g., paper, the image comprised of wax based ink is pressed into the paper.

However, the use of crystalline waxes alone has shortcomings. For example, the crystalline waxes tend to be brittle so as not to provide robust images, and are also easily scratched. This is because wax based inks generally crystallize at temperatures greater than room temperature and therefore, the wax based ink that has been transferred to the recording medium is essentially as hard as it will get. The fragile images cause customer dissatisfaction, and in some markets prevents sales penetration.

Xerox Corporation discovered that curing ultraviolet (UV) photosensitive ink jet inks by photoinitiation of the reactive inks can provide tough, permanent images on an image receiving substrate. See, for example, U.S. Pat. Nos. 6,561, 640 and 6,536,889, each incorporated herein by reference in its entirety. These patents describe processes of forming ink jetted images using UV curable inks. Co-pending Application No. 11/034,850 entitled "Low Level Cure Transfuse Assist for Printing with Radiation Curable Ink," incorporated herein by reference in its entirety, describes ink compositions for use in such processes. Co-pending Application No. 11/034,856 entitled "Ink Jet Ink Curable Via Different Polymerization Routes," incorporated herein by reference in its entirety, describes ink compositions in which the ink vehicle comprises a mixture of at least one cationically curable component and at least one radically curable component.

SUMMARY

What is still desired is ink jet inks in which the hardness and scratch resistance of the ink is improved compared to crystalline wax based ink jet inks.

In embodiments, an ink jet ink is described that comprises an ink vehicle, wherein the ink vehicle comprises a wax monomer chain functionalized to include at least one reactive group curable upon exposure to radiation of an appropriate wavelength.

In the ink vehicle, the one or more reactive groups are preferably comprised of cationically curable groups alone, radically curable groups alone, or comprised of both cationically curable groups and radically curable groups. The ink vehicle preferably includes a wax monomer having a structure:

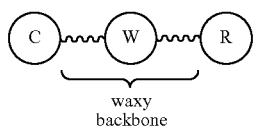

wherein C represents a cationically curable group and R represents a radically curable group, and the ink further preferably comprises a first catalyst for curing of the cationically curable group and a second catalyst for curing of the radically curable group.

In another embodiment, a method of forming an image is described, comprising jetting an ink jet ink comprising an ink vehicle onto a transfuse member surface, wherein the ink vehicle comprises a wax monomer chain functionalized to include at least one reactive group is curable upon exposure to radiation of an appropriate wavelength, increasing the viscosity of the ink on the transfuse member surface, subsequently transferring the ink from the transfuse member surface to an image receiving substrate, and exposing the ink to radiation of an appropriate wavelength to react the at least one reactive group reactive at such wavelength.

Where the ink vehicle includes only cationically curable or radically curable groups, the increasing of the viscosity upon the transfuse member surface comprises cooling the jetted ink. Where the ink vehicle includes both cationically curable groups and radically curable groups in the wax monomer chain, the increasing of the viscosity upon the transfuse member surface comprises effecting reaction of one of the two different curable groups via exposure to radiation of an appropriate wavelength, which wavelength is different than the wavelength at which the other reactive group is reacted after transfer to the image receiving substrate.

DETAILED DESCRIPTION OF EMBODIMENTS

An ink jet ink is thus described that comprises an ink vehicle, wherein the ink vehicle comprises a wax monomer chain functionalized to include one or more reactive groups curable upon exposure to radiation of an appropriate wavelength. For example, where the reactive group is curable upon exposure to ultraviolet (UV) radiation, the ink vehicle may have a structure of:

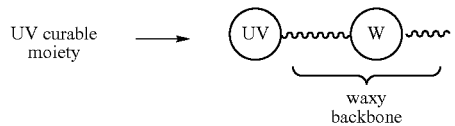

By "wax monomer" herein is meant a material having a hydrocarbon chain including from 5 to about 70 carbon atoms in the chain. The chain may be linear or branched, and a suitable wax may include several such chains extending from a central structure.

In preferred embodiments, the wax monomer chain is comprised of an alcohol (including diols), an amine (including diamines), or a carboxylic acid (including dicarboxylic acids). Commercial dimer diacids are the clay-catalyzed dimerization products of of C-18 unsaturated fatty acids. This condensation reaction produces a variety of structures that are subsequently hydrogenated and may be fractionally distilled to separate monomeric, dimeric and trimeric species. Further derivatization can produce diamines and diols from the diacid. The mixture of different isomers is represented by the structures below.

That is, examples of preferred wax monomers include the following waxes:

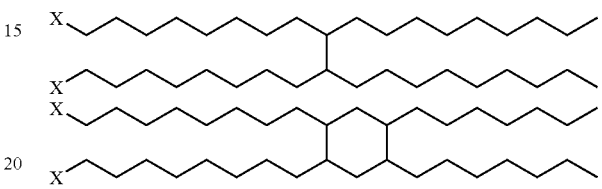

wherein X=OH, $NH_2$, NCO, $CO_2H$ or $CO_2R$ (in which R represents an alkyl group such as methyl, ethyl, etc.) (and including a mixture of hydrocarbon isomers, some with alkane bonds) from Uniqema Chemicals;

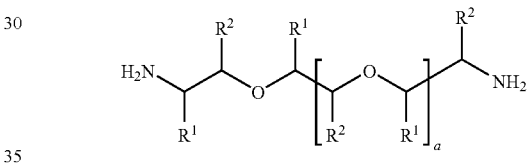

wherein a is 2 to 6 and when $R^1$=$CH_3$, $R^2$=H and when $R^1$=H, $R^2$=$CH_3$ (and including isomeric mixture of propyloxy (PO) units, known as Jeffamines, available from Huntsman Chemicals;

$Y(CH_2)_bY$, wherein Y=OH, $NH_2$, $CO_2H$, and b is greater than 9, available from Aldrich;

$Z(CH_2)_bZ$, wherein Z=$CO_2R$, COCl, b is greater than 9, in which R represents an alkyl group such as methyl, ethyl, etc.;

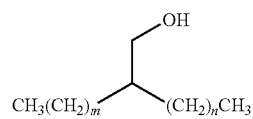

wherein m+n is typically greater than 10, known as Guerbet alcohols, available from Tomah Chemicals;

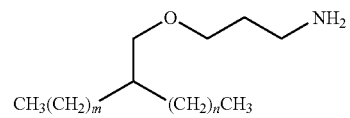

wherein m+n is typically greater than 10, known as aminopropyl terminated Guerbet alcohols, available from Tomah Chemicals;

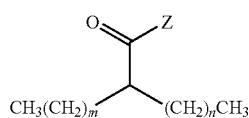

wherein m+n is typically greater than 10, and Z=OH, OR, Cl, OCOR, in which R represents an alkyl group such as methyl, ethyl, etc., derived from Guerbet alcohols from Tomah Chemicals;

$CH_3(CH_2)_aOH$, wherein a is 25 to 50, known as Unilins, available from Baker-Petrolite (these compounds are fully saturated and linear, with a primary alcohol concentration of approximately 80%; the $M_n$ values for Unilins 350, 425, 550 and 700 are 375, 460, 550 and 700 g/mol, respectively);

$CH_3(CH_2)_aCO_2H$, wherein a is 26 to 50, known as Unicid Acids, available from Baker-Petrolite (the samples are about 80% linear carboxylic acids; the other 20% is comprised of primary linear, low molecular weight polyethylene; the $M_n$ values for Unicids 350, 425, 550 and 700 are 390, 475, 565 and 720 g/mol, respectively);

$C_bH_{2b+2}OH$, wherein b is 9 to 24, branched and straight chain alcohols from Aldrich; and $CH_3(CH_2)_bCO_2H$, wherein b is 9 to 24, branched and straight chain carboxylic acids from Aldrich.

In a first embodiment, the wax monomer is functionalized by addition of one or more reactive groups curable by cationic mechanisms. Preferably, one or more of the end groups of the wax monomer backbone are functionalized. Preferably, such reactive groups curable by cationic mechanisms are epoxide, oxetane or vinyl ether groups. As the epoxide, particular mention may be made of cyclic epoxide, acyclic epoxide and glycidyl epoxide. Specific examples may be identified as follows:

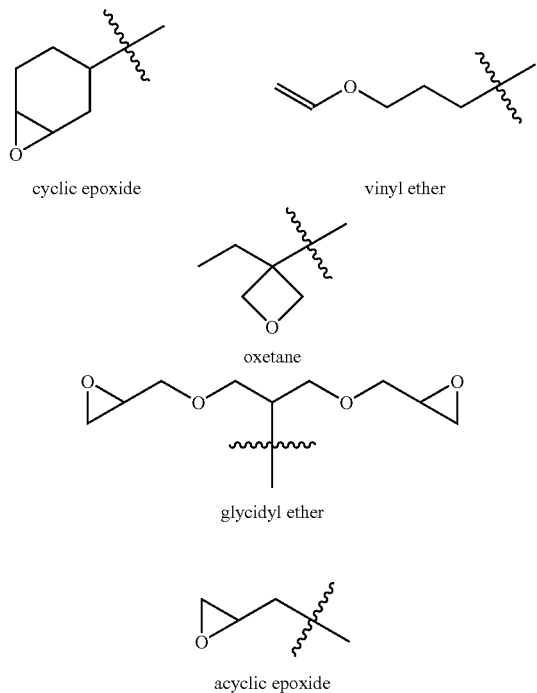

The reactive groups curable by cationic mechanisms may be added to the waxy backbone through any suitable mechanism. For example, a nucleophilic wax monomer may be reacted with an electrophilic reactive group. That is, a nucleophilic wax monomer containing an alcohol group or amine group may be mentioned, including from the aforementioned wax monomers:

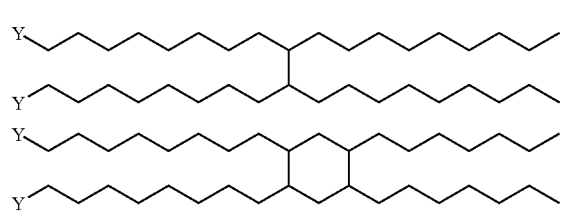

wherein Y=OH or $NH_2$; the Jeffamines; $Y(CH_2)_bY$, wherein Y=OH or $NH_2$; the Guerbet alcohols; the Guerbet alcohol derivatives

wherein Z=OH, OR, Cl, OCOR; $CH_3(CH_2)_aOH$ (Unilins); and $C_bH_{2b+2}OH$. Such nucleophilic wax monomers may be reacted with a compound containing an electrophilic cationically curable group, including from the aforementioned cationically curable groups:

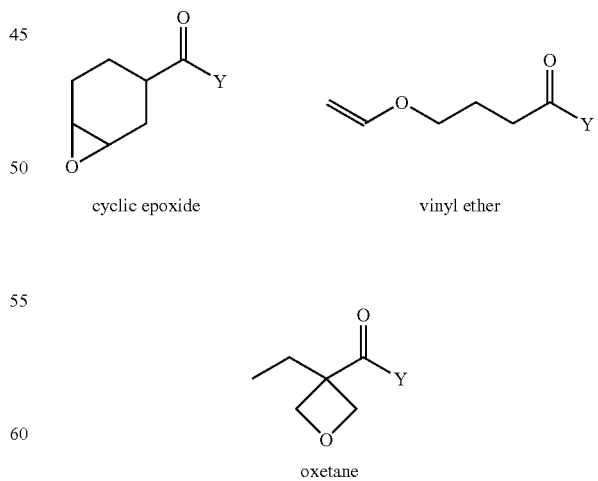

wherein Y=Cl, OR or OCOR, and in which R represents an alkyl group such as methyl, ethyl, etc.

A suitable reaction scheme may be as follows:

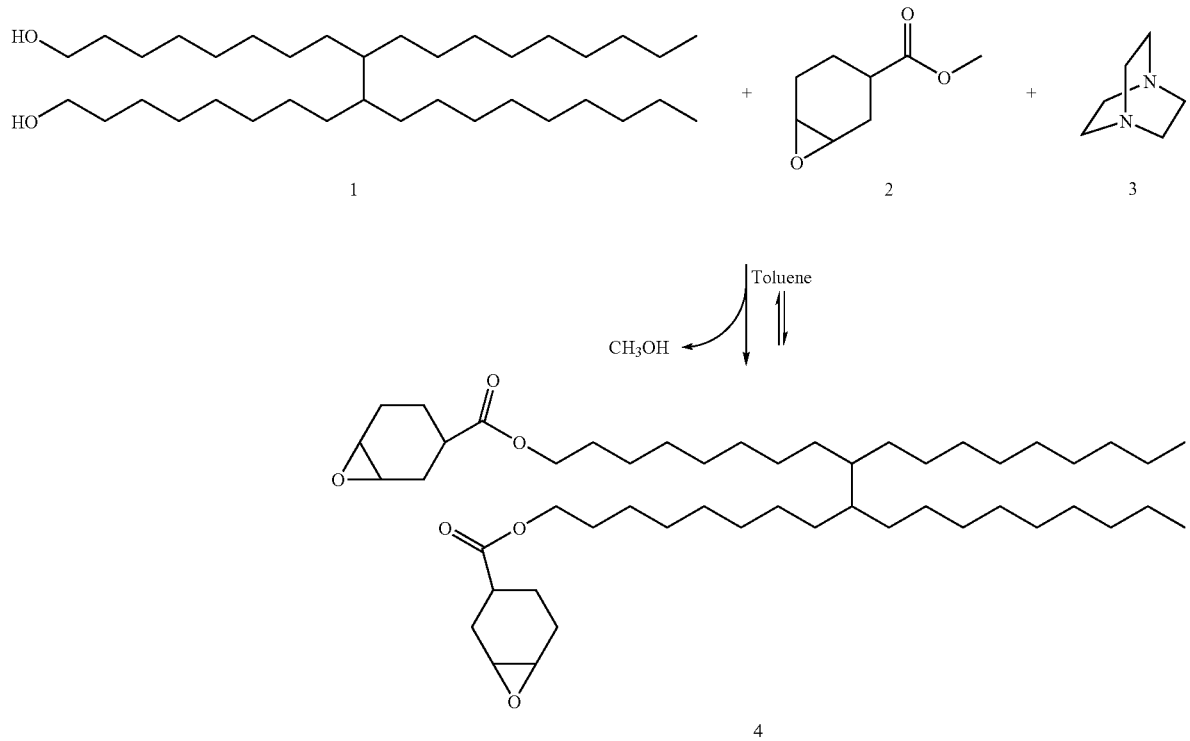

In the above reaction scheme, monomer (4) is synthesized via the transesterification of methyl 3,4-epoxycyclohexane carboxylate (2) with C-36 dimer diol (1) in the presence of DABCO (1,4-diazabicyclo[2.2.2]octane) (3) in toluene at reflux, while removing the formed methanol ($CH_3OH$).

Alternatively, an electrophilic wax monomer may be reacted with a nucleophilic reactive group. That is, an electrophilic wax monomer containing a carboxylic or NCO group may be mentioned, including from the aforementioned wax monomers:

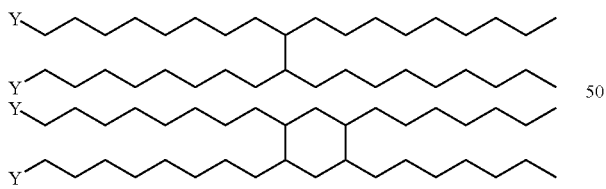

wherein Y=$CO_2H$, $CO_2R$ or NCO (and in which R represents an alkyl group such as methyl, ethyl, etc.); Y($CH_2$)$_b$Y, wherein Y=$CO_2H$ or $CO_2R$ (and in which R represents an alkyl group such as methyl, ethyl, etc.); Z($CH_2$)$_b$Z, wherein Z=$CO_2R$, COCl; the aminopropyl terminated Guerbet alcohols; Unicid Acids; and $CH_3(CH_2)_bCO_2H$ branched and straight chain carboxylic acids. Such electrophilic wax monomers may be reacted with a compound containing a nucleophilic cationically curable group, including from the aforementioned cationically curable groups:

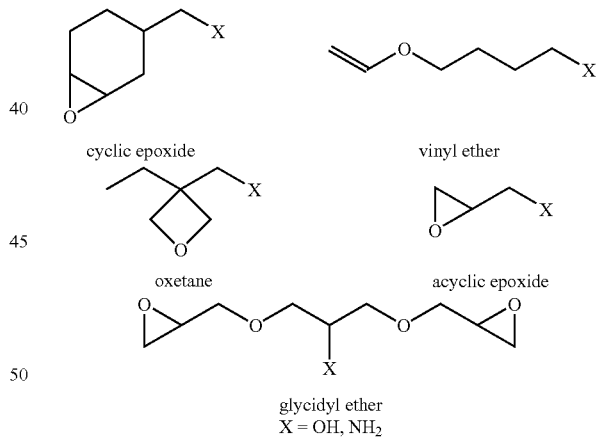

glycidyl ether
X = OH, $NH_2$

In embodiments in which the wax monomer is functionalized with only cationically curable groups, the functionalized compound is preferably solid at room temperature. The ink vehicle is heated to reduce the viscosity of the ink vehicle to a liquid state so as to be jettable. Preferably, jetting temperature is from, for example, about 70° C. to about 130° C.

Following jetting, the ink is allowed to increase in viscosity, i.e., to thicken, on the transfuse member surface. The ink vehicle thus acts as a phase change ink similar to conventional crystalline wax based inks. The transfuse member surface may be heated if desired, e.g., to a temperature of no more than about 60° C. The transfuse member surface may be in any form, preferably in the form of a belt or drum. The ink rapidly cools and solidifies upon the transfuse member surface due to the temperature difference between the jetting temperature of the ink and the transfuse member surface temperature.

The solidified ink on the transfuse member surface may then be transferred to an image receiving substrate. Any substrate may be used without limitation, such as paper, transparency, fabric, etc. Once transferred to the image receiving substrate, the ink may then be finally cured to a hardened, scratch-resistant state by inducing the reaction of the cationically curable groups of the ink vehicle. Specifically, this reaction is effected by exposing the curable groups to radiation having a wavelength at which the curable group is reactive. Such radiation is most preferably ultraviolet (UV) radiation.

So as to be reacted at the desirable wavelength of radiation, the ink vehicle comprised of the wax monomer including the cationically curable reactive groups should contain an initiator that absorbs radiation at the desired wavelength and catalyzes the reaction as a result. In this regard, any suitable initiator may be used without limitation. There are many initiators that can be used for cationic polymerization. The most commonly used cationic initiators are triarylsulphonium and diaryliodonium salts, many of which are commercially available. Other similar type initiators include aryldiazonium salts, triarylselenonium salts, dialkylphenacylsulphonium salts, triarylsulphoxonium salts, aryloxydiarylsulphonoxonium salts, and dialkylphenacylsulphoxonium salts, wherein the salts are formed with ions such as, e.g., $BF_4^-$, $PF_6^-$, $AsF_6^-$, $SbF_6^-$, etc. Substitution is often introduced to the aryl groups in order to increase the solubility of the initiators in nonpolar media. Other specific example initiators that may be mentioned include bis[4-(diphenylsulphonio)-phenyl]sulphide bis-hexafluorophosphate, bis[4-di(4-(2-hydroxyethyl)phenyl)sulphonio-phenyl]sulphide bis-hexafluorophosphate, bis[4-di(4-(2-hydroxyethyl)phenyl) sulphonio-phenyl]sulphide bis-hexafluoroantimonate, 4-methylphenyl-(4-(2-methylpropyl)phenyl)iodonium hexafluorophosphate, and R-gen® BF-1172 (obtained from Chitec Chemical Co., Ltd., Taiwan). Such initiators are typically sensitive in the 200 to 340 nm range, and preferably are selected to be sensitive at 300 nm or less.

The initiators are preferably used in very small amounts (e.g., less than 20% by weight of the wax functionalized with cationic curable groups), preferably less than 10% by weight), and thus have little contribution to the final ink color. The initiators also preferably are stable up to at least the jetting temperature of the ink so as not to lose effectiveness following jetting and/or not to be prematurely reactive at the elevated jetting temperature.

The radiation to cure the cationic photopolymerizable component of the ink vehicle is preferably provided by a variety of possible techniques, including but not limited to a xenon lamp, laser light, microwave energized V bulb, filtered light transported via light pipes from a D or H bulb, etc. The curing light may be filtered, if desired or necessary.

The curing of the ink following transfer to the image receiving substrate is preferably substantially complete to complete, i.e., at least 75% of the cationically curable wax monomer is cured (reacted and/or crosslinked). This allows the ink to be substantially hardened, and thereby be much more scratch resistant than conventional unmodified wax based inks.

In this embodiment, the wax monomer functionalized with cationically curable groups comprises about 65 to about 96% by weight of the ink, preferably.

In a second embodiment, the wax monomer is functionalized by addition of one or more reactive groups curable by free radical mechanisms, i.e., the wax monomer is functionalized to be radically curable. Preferably, one or more of the end groups of the wax monomer backbone are functionalized. Preferably, such reactive groups curable by radical mechanisms are acrylate, methacrylate or vinyl groups. Combined with an appropriate catalyst/photoinitiator, the acrylates provide rapid cure to form tough materials with good adhesion. Specific suitable radically curable moieties may be:

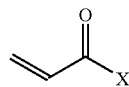

wherein X=OH (acrylic acid) or Cl (acryloyl chloride);

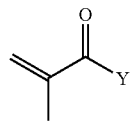

wherein Y=OH (methacrylic acid) or Cl (methacryloyl chloride);

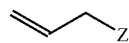

wherein z=OAc (allyl acetate), OTs (allyl tosylate) or Cl, Br (allyl chloride or bromide).

The reactive groups curable by free radical mechanisms may be added to the waxy backbone through any suitable mechanism, similar to the mechanisms discussed above.

In this embodiment, the ink is again jetted at jetting temperatures from, for example, about 70° C. to about 130° C. Some radically polymerizable groups may be reactive at such elevated jetting temperatures. Thus, care should be taken to select radically polymerizable groups that retain an acceptable level of stability at the temperatures at which the ink will be jetted.

As in the first embodiment discussed above, following jetting, the ink is allowed to increase in viscosity, i.e., to thicken, on the transfuse member surface. The ink rapidly cools and solidifies upon the transfuse member surface due to the temperature difference between the jetting temperature of the ink and the transfuse member surface temperature.

The solidified ink on the transfuse member surface may then be transferred to an image receiving substrate. Once transferred to the image receiving substrate, the ink may then be finally cured to a hardened, scratch-resistant state by inducing the reaction of the radically curable groups of the ink vehicle. Specifically, this reaction is effected by exposing the curable groups to radiation having a wavelength at which the free radical reaction is initiated. Such radiation is most preferably ultraviolet (UV) radiation.

So as to be reacted at the desirable wavelength of radiation, the ink vehicle comprised of the wax monomer including the radically curable reactive groups should contain a catalyst, e.g., a photoinitiator, that absorbs radiation at the desired wavelength and thereby initiates the free radical reaction. In this regard, any suitable photoinitiator may be used without limitation.

As the catalyst, mention may be made of photoinitiators such as 2,4,6-trimethylbenzoyldiphenylphosphine oxide (available as BASF Lucirin TPO); 2,4,6-trimethylbenzoylethoxyphenylphosphine oxide (available as BASF Lucirin TPO-L); bis(2,4,6-trimethylbenzoyl)-phenyl-phosphine oxide (available as Ciba Irgacure 819) and other acyl phosphines; 2-benzyl 2-dimethylamino 1-(4-morpholinophenyl) butanone-1 (available as Ciba Irgacure 369); titanocenes; and isopropylthioxanthone; 1-hydroxy-cyclohexylphenylketone; benzophenone; 2-methyl-1-(4-methylthio)phenyl-2-(4-morphorlinyl)-1-propanone; diphenyl-(2,4,6-trimethylbenzoyl) phosphine oxide; 2,4,6-trimethylbenzoylphenylphosphinic acid ethyl ester; oligo(2-hydroxy-2-methy-1-(4-(1-methylvinyl)phenyl)propanone); 2-hydroxy-2-methyl-1-phenyl-1-propanone; benzyl-dimethylketal; and mixtures thereof. Mention may also be made of amine synergists, for example such as ethyl-4-dimethylaminobenzoate and 2-ethylhexyl-4-dimethylamino benzoate. These initiators may be selected to have sensitivity at 280 to 420 nm. The initiators are effective to initiate cure when exposed to energy of about 300-2000 millijoules cm$^2$. This list is not exhaustive, and any known photoinitiators that initiate the free radical reaction upon exposure to a desired wavelength of UV light can be used without limitation.

The total amount of photoinitiator included in the ink with respect to the radically curable component may be from, for example, about 0.5 to about 20%, preferably from about 1 to about 10%, by weight. The photoinitiators also preferably are stable up to at least the jetting temperature of the ink so as not to lose effectiveness following jetting and/or not to be prematurely reactive at the elevated jetting temperature.

The radiation to cure the radically photopolymerizable component of the ink vehicle is preferably provided by the same techniques as discussed above for the cationically curable component, e.g., by xenon lamp, laser light, microwave energized V bulb, filtered light transported via light pipes from a D or H bulb, etc.

The curing of the ink following transfer to the image receiving substrate is preferably substantially complete to complete, i.e., at least 75% of the radically curable wax monomer is cured (reacted and/or crosslinked). This allows the ink to be substantially hardened, and thereby be much more scratch resistant than conventional unmodified wax based inks.

In this embodiment, the wax monomer functionalized with radically curable groups comprises about 65 to about 96% by weight of the ink, preferably.

In a third embodiment, the wax monomer is functionalized with both one or more cationically curable groups and one or more radically curable groups. In the above embodiments, the ink vehicle was designed to include either cationically curable groups or radically curable groups, but not both. In using the inks, the post-transfer image is exposed to UV light to initiate either a radical or cationic polymerization process that increases the robustness of the final image. The wax is solidified on the transfuse member surface before it is transferred to the image receiving substrate, which requires a large temperature difference between the jetting head and the transfuse member surface as discussed above.

Rather than rely on the large temperature difference to effect solidification of the ink on the transfuse member surface, the ink in this embodiment is a hybrid wax monomer that contains both radically and cationically UV curable moieties. The wax is heated in the printhead and remains in a liquid state during jetting onto the transfuse member. Once on the member, the image is exposed to radiation at a first specific wavelength, hence initiating the selective polymerization of one of the sets of functional groups. This initial curing would ensure that the ink is sufficiently increased in viscosity, e.g., solidified, on the transfuse member surface such that color bleeding would be minimized. Thus, solidification with this ink is achieved via curing of one of the two differently curable functional groups. Once the ink is transferred to the image receiving substrate, the image would be exposed to radiation again, preferably at a wavelength different from the first wavelength, to cure the remaining active functional group. The result would be a robust final image having suitable hardness and scratch resistance.

A general structure for the hybrid wax monomer of this embodiment may be represented as:

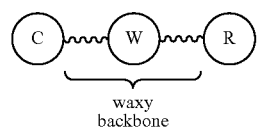

wherein C represents the cationically curable group and R represents the radically curable group.

In this embodiment, the wax monomer backbone obviously must possess two different sites, preferably end sites, that can each be functionalized by one of the two different reactive groups. That is to say, the wax monomer must be at least difunctional in this embodiment. Thus, the wax monomer backbone in this embodiment is preferably a diol, diamine or dicarboxylic acid. Any of the aforementioned wax monomers having two such sites may be used, including, for example, the waxy monomers from Uniqema Chemicals, the Jeffamines, Y(CH$_2$)$_b$Y, and Z(CH$_2$)$_b$Z.

As the cationically curable moieties and as the radically curable moieties, any of the same moieties described extensively above may be used.

The ink vehicle of this embodiment may be made is made by any suitable method without limitation. In a preferred embodiment, the ink vehicle is made by first protecting one of the wax monomer functional sites, reacting the other wax monomer functional site with one of the two different types of curable groups, deprotecting the other wax monomer functional site, and then reacting the deprotected site with the other of the two different types of curable groups. An example scheme may be shown as:

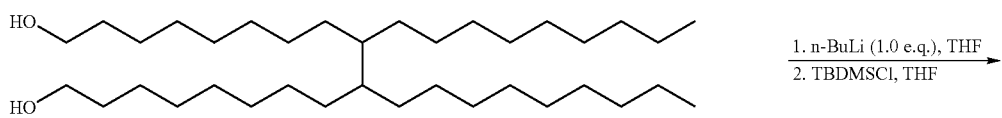

-continued

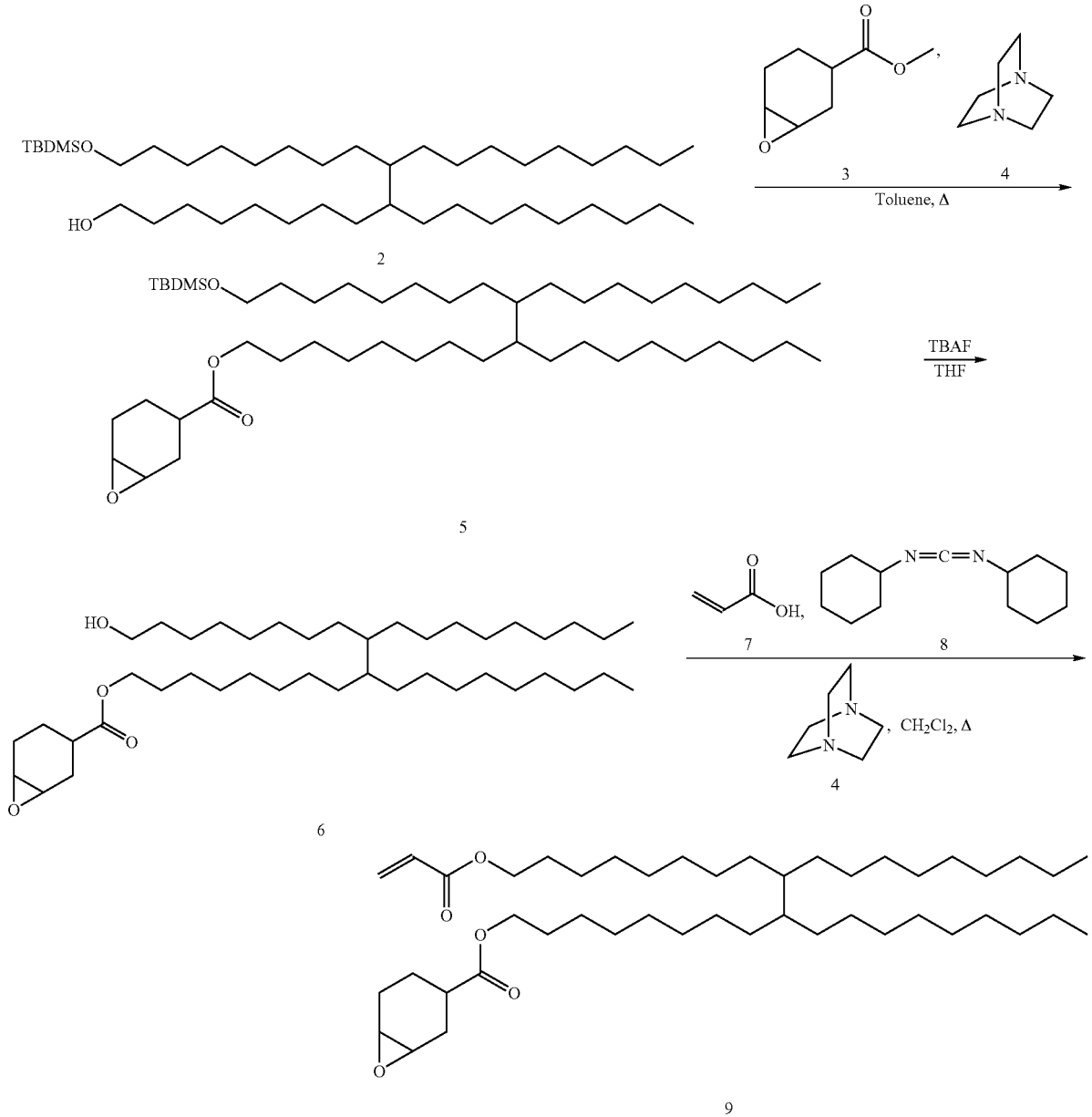

In this scheme, hybrid monomer (9) is synthesized. C36-dimer diol (1) is singly deprotonated by reaction with one equivalent of n-butyllithium (n-BuLi) in tetrahydrofuran (THF). The anion is trapped with tert-butyldimethylsilyl chloride (TBDMSCl) to form monoprotected ether (2). The remaining hydroxyl group is transformed to an ester via reaction with methyl 3,4-epoxycyclohexane carboxylate (3) in the presence of 1,4-diazabicyclo[2.2.2]octane (DABCO) (4) in toluene at reflux. The silyl protecting group is removed with tetrabutylammonium fluoride (TBAF). The resulting hydroxyl group is esterified by reaction with acrylic acid (7) in the presence of dicyclocarbodiimide (DCC (8)) and DABCO in methylene chloride (CH$_2$Cl$_2$) at reflux.

As discussed above, once the ink is jetted onto the transfuse member, the ink is exposed to radiation at a first specific wavelength to initiate the selective polymerization of one of the sets of functional groups. Either the cationically curable group or the radically curable group may be selected to be first cured. The curing of this group upon the transfuse member surface is substantially complete to nearly complete as discussed above, while the other functional group is substantially not reacted on the transfuse member surface. This curing of one of the two different reactive functional groups enables the ink to sufficiently increase in viscosity on the transfuse member surface such that color bleeding is minimized, yet to also retain a sufficient rheology to be effectively transferred to the image receiving substrate. Once the ink is transferred to the image receiving substrate, the ink is exposed to radiation again, preferably having a wavelength different from the wavelength of the first radiation exposure above, to substantially completely to completely cure the remaining active functional group. This additional curing hardens the ink to achieve a robust final image having scratch resistance.

To effect the curing at the different wavelengths, appropriate catalysts that absorb at different wavelengths should be chosen for curing of each of the two different functional reactive groups.

The amount of each type of curable reactive group included in the waxy monomer in this embodiment may be readily controlled via the amounts of components used in the formation process. Preferably, each type of the curable reactive group is present such that the wax monomer includes from between about 10 to about 90% of each type of reactive group relative to the total amount of reactive groups attached to the monomer. The amount of each group may be selected based upon the extent of thickening that is desired on the transfuse member surface. It should be understood in this regard that not every wax monomer backbone of the ink vehicle will include one of each of the two types of reactive groups. Certain wax monomers in the ink vehicle may include only one of the two types of reactive groups. However, an overall sufficient mix of wax monomers including the two types of reactive groups in the ink vehicle is present such that the ink can be sufficiently thickened on the transfuse member surface and thereafter sufficiently hardened on the image receiving substrate.

In this third embodiment, the ink may be jetted at conventional jetting temperatures as with the inks of the first and second embodiments discussed above. However, because the inks do not need to rely upon cooling alone in order to increase in viscosity on the transfuse member surface, the inks may be jetted at lower temperatures, e.g., anywhere from about 35° C. to about 140° C. The ink vehicle must have a sufficient viscosity, e.g., about 5 to about 20 cP, preferably about 10 to about 15 cP, at the selected jetting temperature (viscosity as measured by, e.g., a Rheometrics (now TA Instruments) RFS rheometer). In this regard, the ink vehicle of this embodiment may be liquid at room temperature.

Besides the ink vehicle, the inks also preferably include a colorant, e.g., a pigment or dye. The colorant is preferably readily dispersible in the ink vehicle.

As the dye or pigment colorant media, any suitable dye or pigment may be used without limitation so long as the colorant is dispersible within the ink vehicle. Examples of suitable pigments include, but are not limited to, Violet PALIOGEN Violet 5100 (BASF); PALIOGEN Violet 5890 (BASF); HELIOGEN Green L8730 (BASF); LITHOL Scarlet D3700 (BASF); Sunfast® Blue 15:4 (Sun Chemical 249-0592); Hostaperm Blue B2G-D (Clariant); Permanent Red P-F7RK; Hostaperm Violet BL (Clariant); LITHOL Scarlet 4440 (BASF); Bon Red C (Dominion Color Company); ORACET Pink RF (Ciba); PALIOGEN Red 3871 K (BASF); Sunfast® Blue 15:3 (Sun Chemical 249-1284); PALIOGEN Red 3340 (BASF); Sunfast® Carbazole Violet 23 (Sun Chemical 246-1670); LITHOL Fast Scarlet L4300 (BASF); Sunbrite Yellow 17 (Sun Chemical 275-0023); HELIOGEN Blue L6900, L7020 (BASF); Sunbrite Yellow 74 (Sun Chemical 272-0558); Spectra Pac® C Orange 16 (Sun Chemical 276-3016); HELIOGEN Blue K6902, K6910 (BASF); Sunfast® Magenta 122 (Sun Chemical 228-0013); HELIOGEN Blue D6840, D7080 (BASF); Sudan Blue OS (BASF); NEOPEN Blue FF4012 (BASF); PV Fast Blue B2GO1 (Clariant); IRGALITE Blue BCA (Ciba); PALIOGEN Blue 6470 (BASF); Sudan Orange G (Aldrich), Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Lumogen Yellow D0790 (BASF); Suco-Yellow L1250 (BASF); Suco-Yellow D1355 (BASF); Suco Fast Yellow D1 355, D1 351 (13ASF); HOSTAPERM Pink E O₂ (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT), PALIOGEN Black L0084 (BASF); Pigment Black K801 (BASF); and carbon blacks such as REGAL 330™ (Cabot), Carbon Black 5250, Carbon Black 5750 (Columbia Chemical); mixtures thereof and the like. Examples of suitable dyes include Usharect Blue 86 (Direct Blue 86), available from Ushanti Colour; Intralite Turquoise 8GL (Direct Blue 86), available from Classic Dyestuffs; Chemictive Brilliant Red 7BH (Reactive Red 4), available from Chemiequip; Levafix Black EB, available from Bayer; Reactron Red H8B (Reactive Red 31), available from Atlas Dye-Chem; D&C Red #28 (Acid Red 92), available from Warner-Jenkinson; Direct Brilliant Pink B, available from Global Colors; Acid Tartrazine, available from Metrochem Industries; Cartasol Yellow 6GF Clariant; Carta Blue 2GL, available from Clariant; and the like. Particularly preferred are solvent dyes. Within the class of solvent dyes, spirit soluble dyes are preferred because of their compatibility with the ink vehicles of the inks. Examples of suitable spirit solvent dyes include Neozapon Red 492 (BASF); Orasol Red G (Ciba); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (Ciba); Orasol Black RLP (Ciba); Savinyl Black RLS (Clariant); Morfast Black Conc. A (Rohm and Haas); Orasol Blue GN (Ciba); Savinyl Blue GLS (Sandoz); Luxol Fast Blue MBSN (Pylam); Sevron Blue 5GMF (Classic Dyestuffs); Basacid Blue 750 (BASF), and the like. Neozapon Black X51 [C.I. Solvent Black, C.I. 12195] (BASF), Sudan Blue 670 [C.I. 61554] (BASF), Sudan Yellow 146 [C.I. 12700] (BASF), and Sudan Red 462 [C.I. 260501] (BASF) are preferred.

The colorant is preferably included in the ink in an amount of from, for example, about 0.1 to about 15% by weight of the ink, preferably about 0.5 to about 8% by weight of the ink.

The inks of embodiments of the invention may further include conventional additives to take advantage of the known functionality associated with such conventional additives. Such additives may include, for example, clarifiers, defoamers, slip and leveling agents, pigment dispersants, etc.

The inks may be used in any type of ink jet printer including a thermal ink jet, acoustic ink jet or piezoelectric ink jet printer, but most preferably are used in a piezoelectric ink jet printer.

The following example inks were prepared to further illustrate embodiments of the invention.

EXAMPLE I

Nonyl 3,4-epoxycylohexanecarboxylate

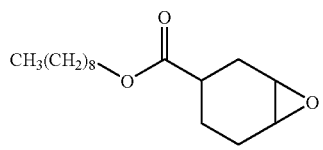

To a 3-neck 250 mL flask equipped with an argon inlet, stir bar and distillation apparatus was added 1-nonanol (19.99 g, 0.14 mol, obtained from Sigma-Aldrich), methyl 3,4-epoxy-cyclohexanecarboxylate (ERL-4140, 23.80 g, 0.15 mol, obtained from Dow Chemical Company), 1,4-diazabicyclo [2.2.2]octane (DABCO™, 3.96 g, 35 mmol, obtained from Sigma-Aldrich) and toluene (60 mL). The reaction mixture was refluxed until methanol ceased collecting in the receiving flask and the completion of the reaction was confirmed by $^1$H NMR spectroscopy. The still pot from the distillation was diluted with toluene (60 mL) and washed with brine (3×60 mL). The organic layer was separated, dried over MgSO$_4$ and filtered. The solvent was removed in vacuo. The excess methyl 3,4-epoxycyclohexane carboxylate was removed via Kugelrohr distillation under reduced vacuum to give 33.39 g (90%) of a clear, colorless oil of nonyl-3,4-epoxycylohexanecarboxylate $^1$H NMR (CDCl$_3$, δ): 4.06 (td, J=6.7, 1.9 Hz, 2H), 3.25-3.10 (m, 2H), 2.55-2.42 (m, 1H), 2.31-1.27 (m, 20H), 0.88 (t, J=6.7 Hz, 3H).

EXAMPLE II

Octadecyl 3,4-epoxycyclohexanecarboxylate

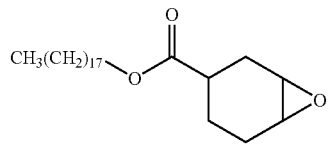

To a 3-neck 100 mL flask equipped with an argon inlet, stir bar and distillation apparatus was added 1-octadecanol (5.03 g, 19 mmol, obtained from Sigma-Aldrich), methyl 3,4-epoxycyclohexanecarboxylate (ERL-4140, 8.69 g, 56 mmol, obtained from Dow Chemical Company), 1,4-diazabicyclo[2.2.2]octane (DABCO™, 1.02 g, 9.1 mmol, obtained from Sigma-Aldrich) and toluene (15 mL). The reaction mixture was refluxed until methanol ceased collecting in the receiving flask and the completion of the reaction was confirmed by $^1$H NMR spectroscopy. The still pot from the distillation was diluted with toluene (15 mL) and washed with brine (3×15 mL). The organic layer was separated, dried over MgSO$_4$ and filtered. The solvent was removed in vacuo. The excess methyl 3,4-epoxycyclohexane carboxylate was removed via Kugelrohr distillation under reduced vacuum to give 6.78 g (87%) of a white solid (mp=32-34° C.) of octadecyl 3,4-epoxycyclohexanecarboxylate. $^1$H NMR (CDCl$_3$, δ): 4.06 (td, J=6.7, 1.9 Hz, 2H), 3.25-3.14 (m, 2H), 2.55-2.45 (m, 1H), 2.31-1.26 (m, 38H), 0.88 (t, J=6.7 Hz, 3H).

EXAMPLE III 3,4-Epoxycyclohexanecarboxylate ester of 2-hexadecyl-1-icosanol

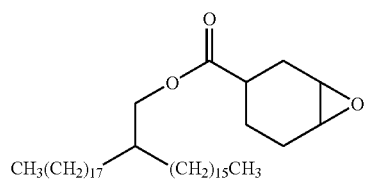

To a 3-neck 100 mL flask equipped with an argon inlet, stir bar and distillation apparatus was added 2-hexadecyl-1-icosanol (5.02 g, 9.6 mmol, obtained from Tomah Products, Inc.), methyl 3,4-epoxycyclohexanecarboxylate (ERL-4140, 4.81 g, 31 mmol, obtained from Dow Chemical Company), 1,4-diazabicyclo[2.2.2]octane (DABCO™, 0.56 g, 5.0 mmol, obtained from Sigma-Aldrich) and toluene (15 mL). The reaction mixture was refluxed until methanol ceased collecting in the receiving flask and the completion of the reaction was confirmed by $^1$H NMR spectroscopy. The still pot from the distillation was diluted with toluene (15 mL) and washed with brine (3×15 mL). The organic layer was separated, dried over MgSO$_4$ and filtered. The solvent was removed in vacuo. The excess methyl 3,4-epoxycyclohexane carboxylate was removed via Kugelrohr distillation under reduced vacuum to give 5.45 g (88%) of a sticky, waxy white solid of 3,4-epoxycyclohexanecarboxylate ester of 2-hexadecyl-1-icosanol. $^1$H NMR (CDCl$_3$, δ): 4.00 (dd, J=5.6, 2.2 Hz, 2H), 3.26-3.18 (m, 2H), 2.60-2.45 (m, 1H), 2.33-1.22 (m, 71H), 0.90 (t, J=6.7 Hz, 6H).

EXAMPLE IV

Bis-3,4-epoxycyclohexanecarboxylate ester of 1,10-decanediol

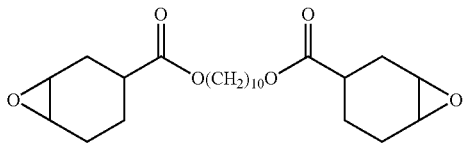

To a 3-neck 250 mL flask equipped with an argon inlet, stir bar and distillation apparatus was added 1,10-decanediol (20.04 g, 0.11 mol, obtained from Sigma-Aldrich), methyl 3,4-epoxycyclohexanecarboxylate (ERL-4140, 39.66 g, 0.25 mol, obtained from Dow Chemical Company), 1,4-diazabicyclo[2.2.2]octane (DABCO™, 6.41 g, 57 mmol, obtained from Sigma-Aldrich) and toluene (60 mL). The reaction mixture was refluxed until methanol ceased collecting in the receiving flask and the completion of the reaction was confirmed by $^1$H NMR spectroscopy. The still pot from the distillation was diluted with toluene (60 mL) and washed with brine (3×60 mL). The organic layer was separated, dried over MgSO$_4$ and filtered. The solvent was removed in vacuo. The excess methyl 3,4-epoxycyclohexane carboxylate was removed via Kugelrohr distillation under reduced vacuum to give a clear, colourless oil in quantitative yield of bis-3,4-epoxycyclohexanecarboxylate ester of 1,10-decanediol. $^1$H NMR (CDCl$_3$, δ): 4.06 (td, J=6.7, 1.6 Hz, 4H), 3.25-3.14 (m, 4H), 2.54-2.46 (m, 2H), 2.31-1.29 (m, 28H).

EXAMPLE V

Bis-3,4-epoxycyclohexanecarboyxlate ester of 1,12-dodecanediol

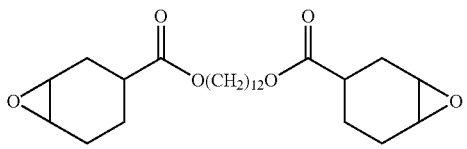

To a 3-neck 250 mL flask equipped with an argon inlet, stir bar and distillation apparatus was added 1,12-dodecanediol (19.98 g, 99 mmol, obtained from Sigma-Aldrich), methyl 3,4-epoxycyclohexanecarboxylate (ERL-4140, 36.92 g, 236 mmol, obtained from Dow Chemical Company), 1,4-diazabicyclo[2.2.2]octane (DABCO™, 5.44 g, 49 mmol, obtained from Sigma-Aldrich) and toluene (60 mL). The reaction mixture was refluxed until methanol ceased collecting in the receiving flask and the completion of the reaction was confirmed by ¹H NMR spectroscopy. The still pot from the distillation was diluted with toluene (60 mL) and washed with brine (3×60 mL). The organic layer was separated, dried over MgSO₄ and filtered. The solvent was removed in vacuo. The excess methyl 3,4-epoxycyclohexane carboxylate was removed via Kugelrohr distillation under reduced vacuum to give a dark orange oil in quantitative yield of bis-3,4-epoxycyclohexanecarboyxlate ester of 1,12-dodecanediol. ¹H NMR (CDCl₃, δ): 4.09 (td, J=6.7, 1.7 Hz, 4H), 3.28-3.17 (m, 4H), 2.65-2.45 (m, 2H), 2.34-1.30 (m, 32H).

EXAMPLE VI

Bis-3,4-epoxycyclohexanecarboxylate ester of Pripol® 2003

To a 3-neck 250 mL flask equipped with an argon inlet, stir bar and distillation apparatus was added Pripol® 2003 (28.77 g, 53 mmol, obtained from Uniqema; further information on C₃₆ dimer diols of this type is disclosed in, for example, "Dimer Acids," *Kirk-Othmer Encyclopedia of Chemical Technology*, Vol. 8, 4ᵗʰ Ed. (1992), pp. 223 to 237, the disclosure of which is totally incorporated herein by reference), methyl 3,4-epoxycyclohexanecarboxylate (ERL-4140, 20.00 g, 128 mmol, obtained from Dow Chemical Company), 1,4-diazabicyclo[2.2.2]octane (DABCO™, 2.97 g, 26 mmol, obtained from Sigma-Aldrich) and toluene (100 mL). The reaction mixture was refluxed until methanol ceased collecting in the receiving flask and the completion of the reaction was confirmed by ¹H NMR spectroscopy. The still pot from the distillation was diluted with toluene (100 mL) and washed with brine (3×100 mL). The organic layer was separated, dried over MgSO₄ and filtered. The solvent was removed in vacuo. The excess methyl 3,4-epoxycyclohexane carboxylate was removed via Kugelrohr distillation under reduced vacuum to give 39.90 g (95%) of a clear, viscous, orange oil of bis-3,4-epoxycyclohexanecarboxylate ester of Pripol® 2003. ¹H NMR (CDCl₃, δ): 4.05 (td, J=6.6, 1.7 Hz, 4H), 3.28-3.14 (m, 4H), 2.65-2.55 (m, 2H), 2.31-1.05 (m, 68H), 0.88-0.83 (m, 9H).

EXAMPLE VII

Ink Base A: To a beaker equipped with a stir bar was added 4.5 g of bis-3,4-epoxycyclohexanecarboxylate ester of 1,10-decanediol (Example IV), 4.5 g of bis-3,4-epoxycyclohexanecarboxylate ester of Pripol® 2003 (Example VI) and 1.0 g of R-gen® BF-1172 (obtained from Chitec Chemical Co., Ltd., Taiwan). The mixture was heated at 90° C. with stirring until homogeneous (~1 h). The formulation showed evidence of increased scratch resistance when exposed to UV light from a UV Fusion LC-6B Benchtop Conveyor equipped with UV Fusion F300S Ultraviolet Lamp System employing an "H" bulb (λ=200-340 nm). An additional measurement of cure was made by coating the formulation on a glass slide and exposing to UV light (5 passes, 32 ft/min, H-bulb). The resulting cured product was scraped from the glass slide and analyzed by ¹H NMR spectroscopy for the decrease in intensity of the epoxy protons between 3.1 and 3.2 ppm, in relation to the proton alpha to the carbonyl group ca. 2.5 ppm. Polymerization measured by the relative intensity of protons $H_A$ and proton $H_B$:

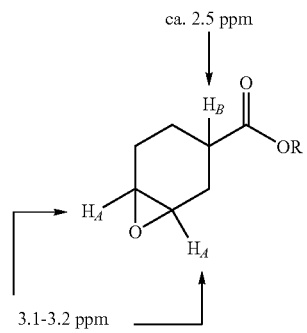

EXAMPLE VIII

Ink Base B: To a beaker equipped with a stir bar was added 8.0 g of bis-3,4-epoxycyclohexanecarboxylate ester of 1,10-decanediol (Example IV), 1.0 g of polycaprolactone diol (average $M_n$ ca. 530, obtained from Sigma-Aldrich) and 1.0 g of R-gen® BF-1172 (obtained from Chitec Chemical Co., Ltd., Taiwan). The mixture was heated at 90° C. with stirring until homogeneous (~1 h). The formulation showed evidence of increased scratch resistance when exposed to UV light from a UV Fusion LC-6B Benchtop Conveyor equipped with UV Fusion F300S Ultraviolet Lamp System employing an "H" bulb (λ=200-340 nm). ¹H NMR spectroscopy analysis revealed that the signal corresponding to the epoxide protons had decreased, indicating that polymerization had occurred.

EXAMPLE IX

Ink Base C: To a beaker equipped with a stir bar was added 8.0 g of bis-3,4-epoxycyclohexanecarboxylate ester of 1,10-decanediol (Example IV), 1.0 g of polycaprolactone diol (average $M_n$ ca. 1250, obtained from Sigma-Aldrich) and 1.0 g of R-gen® BF-1172 (obtained from Chitec Chemical Co., Ltd., Taiwan). The mixture was heated at 90° C. with stirring until homogeneous (~1 h). The formulation showed evidence of increased scratch resistance when exposed to UV light from a UV Fusion LC-6B Benchtop Conveyor equipped with UV Fusion F300S Ultraviolet Lamp System employing an "H" bulb (λ=200-340 nm ¹H NMR spectroscopy analysis revealed that the signal corresponding to the epoxide protons had decreased, indicating that polymerization had occurred.

EXAMPLE X

Ink Base D: To a beaker equipped with a stir bar was added 8.0 g of bis-3,4-epoxycyclohexanecarboxylate ester of 1,10-decanediol (Example IV), 1.0 g of polycaprolactone diol (average $M_n$ ca. 2000, obtained from Sigrna-Aldrich) and 1.0 g of R-gen® BF-1172 (obtained from Chitec Chemical Co., Ltd., Taiwan). The mixture was heated at 90° C. with stirring until homogeneous (~1 h). The formulation showed evidence of increased scratch resistance when exposed to UV light from a UV Fusion LC-6B Benchtop Conveyor equipped with UV Fusion F300S Ultraviolet Lamp System employing an "H" bulb (λ=200-340 nm). ¹H NMR spectroscopy analysis revealed that the signal corresponding to the epoxide protons had decreased, indicating that polymerization had occurred.

While various embodiments have been described above, it is evident that many alternatives, modifications and variations will be apparent to those skilled in the art. Accordingly, the preferred embodiments, as set forth above, are intended to be illustrative and not limiting. Various changes may be made without departing from the spirit and scope of the invention.

What is claimed is:

1. An ink jet ink comprising an ink vehicle, wherein the ink vehicle comprises at least one wax monomer functionalized with at least one cationically curable reactive group and at least one radically curable reactive group,
the cationically curable reactive group is selected from the group consisting of epoxide groups and oxetane groups, and
the at least one wax monomer comprises a hydrocarbon having a chain length of at least 9 to about 70 carbon atoms, wherein
the wax monomer is selected from the group consisting of

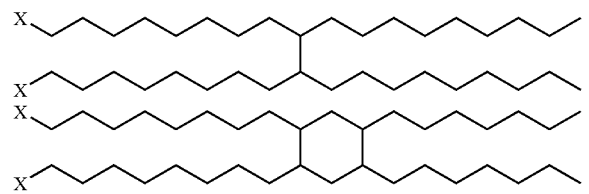

where X=OH, NH$_2$, NCO, CO$_2$H or CO$_2$R in which R is an alkyl group;
Y(CH$_2$)$_b$Y, where Y=OH, NH$_2$, CO$_2$H, and b is greater than 9;
Z(CH$_2$)$_b$Z, where Z=CO$_2$R, COCl, b is greater than 9, and R represents an alkyl group;

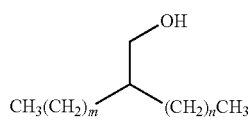

where m+n is greater than 10;

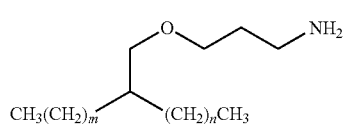

where m+n is greater than 10;

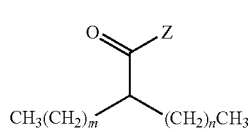

where m+n is greater than 10, and Z=OH, OR, Cl, OCOR, in which R represents an alkyl group;
CH$_3$(CH$_2$)$_a$OH, where a is 25 to 50;
CH$_3$(CH$_2$)$_a$CO$_2$H, where a is 26 to 50; and
CH$_3$(CH$_2$)$_b$CO$_2$H, where b is 9 to 24.

2. The ink jet ink according to claim 1, wherein the radically curable reactive group is selected from the group consisting of acrylate group, methacrylate group and vinyl group.

3. The ink jet ink according to claim 1, wherein the cationically curable reactive group comprises from 10 to 90% of a total number of cationically and radically curable reactive groups of the ink vehicle.

4. The ink jet ink according to claim 1, further comprising at least one colorant.

5. The ink jet ink according to claim 1, further comprising one or more catalysts for the cationically curable reactive group.

6. An ink jet ink comprising:
an ink vehicle comprising a compound having a structure:

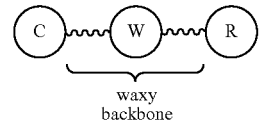

wherein:
C represents a cationically curable group selected from the group consisting of epoxide groups and oxetane groups, and
R represents a radically curable group;
a first catalyst for curing of the cationically curable group;
a second catalyst for curing of the radically curable group; and
the waxy backbone comprises a hydrocarbon having a chain length of at least 9 to about 70 carbon atoms, wherein
the waxy backbone is selected from the group consisting of

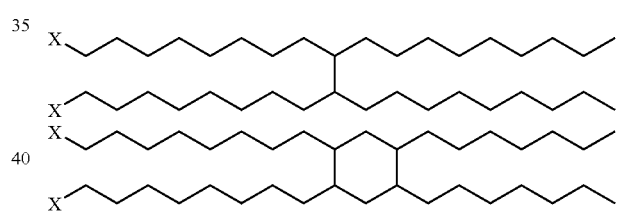

where X=OH, NH$_2$, NCO, CO$_2$H or CO$_2$R in which R is an alkyl group;
Y(CH$_2$)$_b$Y, where Y=OH, NH$_2$, CO$_2$H, and b is greater than 9;
Z(CH$_2$)$_b$Z, where Y=CO$_2$R, COCl, b is greater than 9, and R represents an alkyl group;

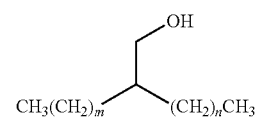

where m+n is greater than 10;

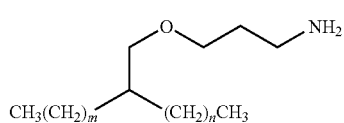

where m+n is greater than 10;

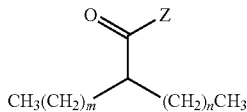

where m+n is greater than 10, and Z=OH, OR, Cl, OCOR, in which R represents an alkyl group;

$CH_3(CH_2)_aOH$, where a is 25 to 50;

$CH_3(CH_2)_aCO_2H$, where a is 26 to 50; and $CH_3(CH_2)_bCO_2H$, where b is 9 to 24.

7. The ink jet ink according to claim 6, wherein the ink further comprises at least one colorant.

8. A method of forming an image, comprising:

jetting an ink comprising an ink vehicle onto a transfuse member surface, wherein the ink vehicle comprises at least one wax monomer functionalized with at least one cationically curable reactive group selected from the oxetane groups;

increasing the viscosity of the ink upon the transfuse member surface;

subsequently transferring the ink from the transfuse member surface to an image receiving substrate; and exposing the ink to radiation following the transfer to the image receiving substrate to effect reaction of the at least one cationically curable reactive group, wherein the at least one wax monomer comprises a hydrocarbon having a chain length of at least 9 to about 70 carbon atoms, and the wax monomer is selected from the group consisting of

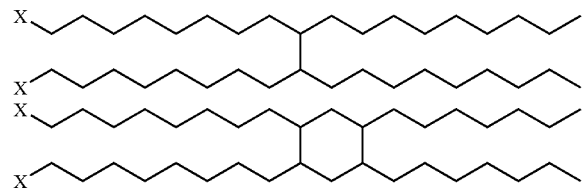

where X=OH, $NH_2$, NCO, $CO_2H$ or $CO_2R$ in which R is an alkyl group;

$Y(CH_2)_bY$, where Y=OH, $NH_2$, $CO_2H$, and b is greater than 9;

$Z(CH_2)_bZ$, where Y=$CO_2R$, COCl, b is greater than 9, and R represents an alkyl group;

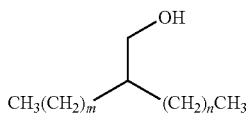

where m+n is greater than 10;

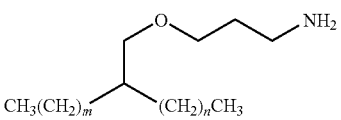

where m+n is greater than 10;

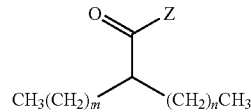

where m+n is greater than 10, and Z=OH, OR, Cl, OCOR, in which R represents an alkyl group;

$CH_3(CH_2)_aOH$, where a is 25 to 50;

$CH_3(CH_2)_aCO_2H$, where a is 26 to 50; and $CH_3(CH_2)_bCO_2H$, where b is 9 to 24.

9. The method according to claim 8, wherein the increasing of the viscosity upon the transfuse member surface comprises cooling the ink on the surface.

10. A method of forming an image, comprising:

jetting an ink comprising an ink vehicle onto a transfuse member surface, wherein the ink vehicle comprises at least one wax monomer functionalized with at least a first and a second reactive group curable upon radiation, wherein one of said first and said second reactive group is a cationically curable reactive group selected from the group consisting of epoxide groups and oxetane groups and the other of said first and said second reactive group is a radically curable reactive group;

increasing the viscosity of the ink upon the transfuse member surface by substantially completely to completely curing the first reactive group on the transfuse member surface;

subsequently transferring the ink from the transfuse member surface to an image receiving substrate; and exposing the ink to radiation following the transfer to the image receiving substrate to effect reaction of the second reactive group, wherein the at least one wax monomer comprises a hydrocarbon having a chain length of at least 9 to about 70 carbon atoms, and the wax monomer is selected from the group consisting of

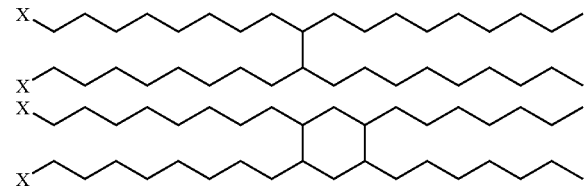

where X=OH, $NH_2$, NCO, $CO_2H$ or $CO_2R$ in which R is an alkyl group;

$Y(CH_2)_bY$, where Y=OH, $NH_2$, $CO_2H$, and b is greater than 9;

$Z(CH_2)_bZ$, where Y=$CO_2R$, COCl, b is greater than 9, and R represents an alkyl group;

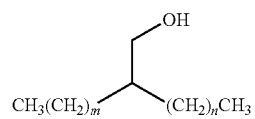

where m+n is greater than 10;

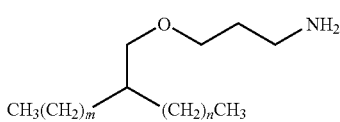

where m+n is greater than 10;

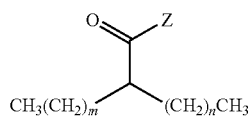

where m+n is greater than 10, and Z=OH, OR, Cl, OCOR, in which R represents an alkyl group;
$CH_3(CH_2)_aOH$, where a is 25 to 50;
$CH_3(CH_2)_aCO_2H$, where a is 26 to 50; and
$CH_3(CH_2)_bCO_2H$, where b is 9 to 24.

11. The method according to claim 10, wherein the first reactive group is curable by cationic polymerization and the second reactive group is curable by free radical polymerization, or the first reactive group is curable by free radical polymerization and the second reactive group is curable by cationic polymerization.

12. The method according to claim 10, wherein the first reactive group is curable upon exposure to radiation having a first wavelength and the second reactive group is curable upon exposure to radiation having a wavelength different from the first wavelength.

13. The ink jet ink of claim 6, wherein the cationically curable group is cyclic epoxide.

14. The method of claim 10, wherein the cationically curable reactive group is cyclic epoxide.

* * * * *